(12) United States Patent
Costa et al.

(10) Patent No.: US 8,023,822 B2
(45) Date of Patent: Sep. 20, 2011

(54) OPTICAL BAND SPLITTER/COMBINER DEVICE COMPRISING A THREE-ARMS INTERFEROMETER

(75) Inventors: Raffaella Costa, Milan (IT); Giuseppe Cusmai, Milan (IT); Andrea Melloni, Milan (IT)

(73) Assignee: Pirelli & C. S.p.A., Milan (IT)

( * ) Notice: Subject to any disclaimer, the term of this patent is extended or adjusted under 35 U.S.C. 154(b) by 677 days.

(21) Appl. No.: 11/883,943

(22) PCT Filed: Feb. 10, 2005

(86) PCT No.: PCT/EP2005/001444
§ 371 (c)(1),
(2), (4) Date: Sep. 10, 2008

(87) PCT Pub. No.: WO2006/084480
PCT Pub. Date: Aug. 17, 2006

(65) Prior Publication Data
US 2009/0041462 A1    Feb. 12, 2009

(51) Int. Cl.
*H04J 14/00* (2006.01)
(52) U.S. Cl. .......................................... 398/68
(58) Field of Classification Search ............ 398/68, 398/79, 83
See application file for complete search history.

(56) References Cited

U.S. PATENT DOCUMENTS

| | | | |
|---|---|---|---|
| 6,084,992 A * | 7/2000 | Weber et al. | 385/24 |
| 6,253,000 B1 * | 6/2001 | Madsen et al. | 385/16 |
| 2004/0179769 A1 | 9/2004 | Dragone | |
| 2008/0266639 A1 * | 10/2008 | Melloni et al. | 359/241 |

FOREIGN PATENT DOCUMENTS

| | | |
|---|---|---|
| EP | 0 565 308 A1 | 10/1993 |
| EP | 1 217 425 A1 | 6/2002 |
| GB | 2 181 857 A | 4/1987 |

OTHER PUBLICATIONS

Takagi et al.; "{1/3} WDM/Splitter Circuits Based on Guided-Wave Double Mach-Zehnder Interferometer Configuration", Proceedings of the European Conference on Optical Communication (ECOC) Regular Papers, Berlin, vol. 1, Conf. 18, pp. 417-420, (1992).
Yao et al.; "A Dense-Wavelength-Division-Multiplexer by Using a Three Arm Mach-Zehnder Interferometer", Acta Optica Sinica, vol. 20, No. 7, pp. 952-956, (2000).
Kok et al.; "Completely Multimode Arrayed Waveguide Grating-Based Wavelength Demultiplexer", EUROCON, Computer as a Tool, IEEE, vol. 2, pp. 422-426, (2003).

(Continued)

*Primary Examiner* — Shi Li
(74) *Attorney, Agent, or Firm* — Finnegan Henderson Farabow Garrett & Dunner LLP

(57) ABSTRACT

A three-arm-Mach-Zehnder interferometer for splitting/combining a first and a second wavelength band, wherein the optical device includes: a first and second optical splitting/combining element; a differential optical delay device comprising a first, a second and a third optical path; each of the first and second optical splitting/combining elements, is of the (25-50-25%)$\lambda$x(0-0-100%)$\lambda$y type, wherein $\lambda$x is a wavelength with the first optical band and $\lambda$y is a wavelength with the second optical band, and the first, second and third optical paths of the differential optical delay device are configured to introduce, at a wavelength $\lambda$z within the first optical band, a phase delay $\Delta\phi$ of $2\pi$m.

17 Claims, 12 Drawing Sheets

OTHER PUBLICATIONS

Barbarossa et al.; "Wide Rejection Band Multidemultiplexer at 1.3-1.55μm by Cascading High-Silica Three-Waveguide Couplers on Si", Electronics Letters, vol. 27, No. 22, pp. 2085-2087, (1991).

Kominato et al.; "Optical Multi/Demultiplexer With a Modified Mach Zehnder Interferometer Configuration", OEC '94, Technical Digest, 14c2-4, pp. 174-175, (1994).

* cited by examiner

OPTICAL BAND SPLITTER/COMBINER DEVICE COMPRISING A THREE-ARMS INTERFEROMETER

CROSS REFERENCE TO RELATED APPLICATION

This application is a national phase application based on PCT/EP2005/001444, filed Feb. 10, 2005, the content of which is incorporated herein by reference.

BACKGROUND OF THE INVENTION

1. Field of the Invention

The present invention relates to an optical device for splitting/combining a first and a second optical wavelength band.

Moreover, the present invention relates to an apparatus for splitting/combining a first and a second optical wavelength band, comprising at least two of said optical devices optically connected in cascade.

The present invention further relates to an optical unit and an optical network comprising at least one of said optical devices.

2. Description of the Related Art

In the present description and claims the expression

"transfer function" with reference to an output port and an input port of an optical device is used to indicate the ratio of the output optical power from the output port with respect to the total optical power in input to the input port of the optical device as a function of wavelength;

"passband", with reference to an output port of an optical device, is used to indicate a band of wavelengths (or frequencies), between specified limits, that the output port is capable of transmitting; the limiting wavelengths of the passband are those at which the transmitted power level decreases to a specified level, typically 3 dB below the maximum level, as the wavelength is decreased or increased from that at which the transmitted power is a maximum;

"stopband", with reference to an output port of an optical device, is used to indicate a band of wavelengths (or frequencies), between specified limits, that the output port is not capable of transmitting; the wavelengths of the stopband are those at which the transmitted power level is below a specified level, typically −20 dB below the maximum level of the corresponding passband at the same port;

"in-band loss" is used to indicate the difference (expressed in dB) between the maximum power level and the minimum power level of optical power transmitted by the port of a device within a predetermined optical wavelength (or frequencies) band which may correspond to the passband of the port of the device or to a sub-band thereof;

"isolation of a wavelength $\lambda a$ with respect to a wavelength $\lambda b$" with reference to a port of a device is used to indicate the difference (expressed in dB) between the optical power transmitted at wavelength $\lambda b$ and the optical power transmitted at wavelength $\lambda a$, wherein $\lambda a$ is a wavelength within the stopband of the port of the device and $\lambda b$ is a wavelength within the passband of said port;

"isolation of a wavelength band $\lambda a$ with respect to a wavelength band $Bb$" with reference to a port of a device is used to indicate the difference (expressed in dB) between the minimum level of optical power transmitted within the band $Bb$ and the maximum level of optical power transmitted within the band $Ba$, wherein the band $Ba$ corresponds to the stopband of the port of the device or to a sub-band thereof and the band $Bb$ corresponds to the passband of the port of the device or to a sub-band thereof;

"through port", in a splitting/combining element having three optical paths and an input port associated with an end of one of the three optical path, is used to indicate the output port of the element which is associated to the opposed end of the optical path with which the input port is associated;

"cross port", in a splitting/combining element having three optical paths and an input port associated with an end of one of the three optical path, is used to indicate the output port of the element which is associated to an end of an optical path other than the one with which the input port is associated;

"power splitting ratio" with reference to a splitting/combining element is used to indicate the ratio of the optical power exiting from each port of the element to the total optical power exiting from the splitting/combining element;

(25-50-25%)$\lambda x$/(0-0-100%)$\lambda y$ three-optical-path splitting/combining element is used to indicate a device which comprises a first, a second and a third optical path, wherein the first optical path is optically coupled to the second optical path and the second optical path is optically coupled to the third optical path and wherein:

for a radiation at wavelength $\lambda x$ comprised in a first optical band in input to the first(third) optical path, is configured to let pass, at the output, about 25% of power of the radiation through the first(third) optical path, about 50% of the power from the first(third) optical path to the second optical path and about 25% of the power from the first(third) optical path to the third(first) optical path;

for a radiation at wavelength $\lambda y$ comprised in a second optical band in input to the first(third) optical path, is configured to let pass, at the output, about 100% of power of the radiation from the first(third) optical path to the third(first) optical path; and that for a radiation at least at a wavelength $\lambda w$ comprised in the first optical band in input to the first(third) optical path, is configured to obtain at the output a phase difference $\Delta\phi$ of about $+(\pi/2)+2K_1\pi$ [or, $-(\pi/2)+2K_1\pi$] between the radiation at the second optical path and the radiation at the first(third) optical path, and $+\pi+2K_2\pi$ (or, $-\pi+2K_2\pi$) between the radiation at the third(first) optical path and the radiation at the first(third) optical path, where $K_1$ and $K_2$ are two integer numbers.

It is pointed out that the above mentioned values of power splitting ratios and phase differences are to be intended to be equal to the cited values with a tolerance of about 20%, preferably 15%, on the power splitting ratio and 10%, preferably 5%, on the phase differences.

Currently, the research is turning towards the possibility of using optics in applications as fiber-to-the-premises (FTTP) networks for broadband delivering of voice, video and high-speed data directly to the home or to a broader community through optical fibers.

Converged voice, video and data services networks are also known as "triple play networks". These networks typically support two signals in downstream direction (from a central station to a user) and one signal in upstream direction (from the user to the central station). Typically, one of the two downstream signals delivers analog television and the other downstream signal delivers digital voice and data services, such as for example telephone and/or Internet. The upstream signal is typically a digital signal delivering voice and data from the user to the central station. The downstream signal delivering analog television is typically transmitted in the wavelength band of 1550±10 nm, the other downstream signal is typically transmitted in the wavelength band of 1490±10 nm, and the upstream signal is typically transmitted in the wavelength band of 1310±50 nm. In order to provide a high-quality analog television service, power requirement in the wavelength band of 1550±10 nm is typically greatly demanding.

Typically, a FTTP network delivers voice, video and data over a passive optical network (PON) using the ITU-T gigabit passive optical network (GPON) standard.

In FTTP networks, as well in many other applications, a key issue is signal splitting and/or combining which allows the downstream and upstream signals to be suitably combined and/or splitted. Typically, the signal splitting/combining is performed in two steps: a first step for splitting/combining the two downstream signals from/with the upstream signal and a second step for splitting/combining the two downstream signals.

The first step requires the splitting/combining of two wide bands widely spaced (centred, for example, at around $\lambda_1$=1310±50 nm and $\lambda_2$=1520±40 nm).

This operation requires an optical band splitter/combiner device which, from an input radiation comprising two signals having wavelength within the two widely spaced wide bands, respectively, is capable of separating the two signals in two different ports of the device by optimizing at each port the loss of transmitted signal and the suppression of the other signal.

In particular, each of the two ports is required to have a wide and flat passband, corresponding to or including a respective one of the two widely spaced wide bands, and a wide stopband, corresponding to or including the other one of the two widely spaced wide bands, that provides a high isolation of the suppressed band with respect to the transmitted one.

Devices for splitting/combining two bands centred at 1300 nm and 1550 nm, respectively, have been proposed in the art.

For example, T. Kominato et al. ("*Optical multi/demultiplexer with a modified Mach Zehnder interferometer configuration*", OEC '94, Technical Digest, July 1994, 14c2-4, pages 174-175) disclose a 1300/1550 nm multi/demultiplexer having a modified Mach-Zehnder (MS) structure in which two 3 dB directional couplers of a conventional MZ are replaced with two MZ interferometers.

However, the Applicant notes that the replacement of the two 3 dB directional couplers with two MZ interferometers is disadvantageous for the compactness of the device.

G. Barbarossa et al. ("*Wide rejection band multidemultiplexer at 1.3-1.55 mm by cascading high-silica three-waveguide couplers on Si*"; Electronics Letters 24 Oct. 1991, Vol. 27, No. 22, pages 2085-2086) disclose a 1300/1550 nm multi/demultiplexer configuration obtained comprising three cascaded identical three-waveguide couplers connected by the two outer waveguides, wherein the guide separation and interaction length of the three-waveguide couplers are selected to obtain multi-demultiplexing at the two wavelengths 1300 and 1550 mm.

SUMMARY OF THE INVENTION

The applicant faced the problem of providing an optical band splitter/combiner device capable of effectively splitting/combining two wide optical wavelength bands having central wavelengths widely spaced.

In a first aspect, the present invention relates to an optical device for splitting/combining a first and a second optical wavelength band, the optical device comprising:

a first and a second optical splitting/combining element each comprising a first, a second and a third optical path, being the first optical path optically coupled to the second optical path and the second optical path optically coupled to the third optical path; and a differential phase delay device comprising a first, a second and a third optical path respectively interposed between and optically coupled to the first, second and third optical path of the first and second optical splitting/combining element, wherein each of the first and second optical splitting/combining element is of the (25-50-25%)$\lambda$x/(0-0-100%)$\lambda$y type, wherein $\lambda$x is a wavelength within the first optical band and $\lambda$y is a wavelength within the second optical band, the first, second and third optical path of the differential optical delay device are configured to introduce, at a wavelength $\lambda$z within the first optical band, a phase delay $\Delta\phi$ of $2\pi$m to an optical radiation propagating through the first optical path with respect to an optical radiation propagating through the second optical path and to an optical radiation propagating through the second optical path with respect to an optical radiation propagating through the third optical path, wherein m is an integer other than zero.

As shown in more detail below, the Applicant found that the use, between two splitting/combining elements of the (25-50-25%)$\lambda$x/(0-0-100%)$\lambda$y type, of a three-optical-path differential optical delay device—adapted to obtain, at a wavelength $\lambda$z within the same optical band of $\lambda$x, the above mentioned phase delay $\Delta\phi$ of $2\pi$m—allows a splitting/combining optical device to be obtained which has a through and a cross port that have a wide and flat passband comprising the second and first optical band, respectively, and provide high isolation of the stopband with respect to the transmitted one.

In particular, said combination of features allows a splitting/combining optical device to be obtained which has a through port having an optimized wide and flat passband wherein $\lambda$y is comprised and a cross port having an optimized wide stopband wherein $\lambda$y is comprised. This allows, at the through port, the in-band loss within the second optical band, wherein $\lambda$y is comprised, to be minimized and, at the cross port of the device, the isolation of the second optical band, wherein $\lambda$y is comprised, with respect to the first optical band, wherein $\lambda$x and $\lambda$z are comprised, to be maximized.

In particular cases in which at the through port of the device higher isolations of the first optical band with respect to the second optical band are needed, a cascaded architecture of the proposed optical device can be used, as shown below.

As shown in more detail below, the Applicant found that the optical device having the above mentioned combination of features provides low in-band loss values within the passbands of the ports of the device and high isolation values within the stopbands with a very compact structure.

Moreover, as shown in more detail below, the Applicant also found that the optical device having the above mentioned combination of features allows strong tolerance to fabrication errors to be obtained.

Preferably, the parameter m, in absolute value, is comprised between 2 and 5. More preferably, it is equal to 3 or 4 in absolute value.

The wavelength $\lambda$z may be equal to or different from the wavelength $\lambda$x. Preferably, wavelength $\lambda$z is approximately equal to wavelength $\lambda$x (e.g. within 10 nm or within 5 nm).

Advantageously, the first, second and third optical path of each splitting/combining element are optically coupled to one other in a parallel configuration.

Advantageously, the optical device is a planar optical waveguide device.

This means that the optical radiation is confined to, and routed through, thin (typically less than 10 microns across) waveguides on the surface region of a substrate (such as, for example, silicon or silicon-on-insulator (SOI) or silica substrate). Said waveguides may also be disposed on multiple layers on the surface of the substrate.

The Applicant found that when the optical device according to the invention is implemented as a planar optical waveguide device, it allows strong tolerance to fabrication errors to be obtained, even in case of high waveguide core-to-cladding refractive index contrast $\Delta n$, wherein $\Delta n$ is equal to or greater than 1%.

On this purpose, the Applicant notes that integrated optical circuit (IOC) devices (in which a variety of opto-electronic devices and planar optical waveguide devices are monolithically integrated and interconnected with waveguides), are particularly promising because they can perform complex circuit functionalities and because they can be made by mass production integrated circuit techniques. The integration of all the components needed for the full functionality in a single opto-electronic integrated circuit may reduce the alignment problem between the single components of the circuit. Moreover, a single integrated chip may increase the automation during the module assembly.

In this context, it is highly desirable to achieve a high-density of devices on a substrate, in order to reach an economic cost-effectiveness. In fact, the higher is the density of devices on the substrate, the higher is the saving in the labour-and-material cost and the shorter is the overall processing time.

In order to achieve a high-density, it is convenient to choose a high core-to-cladding refractive index contrast of the planar waveguides, wherein high refractive index contrast is used to indicate a refractive index contrast equal to or greater than 1%.

However, a problem typically arises with high refractive index contrast, in that the fabrication tolerances and chip-to-fiber alignment tolerances worsen as the refractive index contrast increases. Nonetheless, cost-effectiveness of the IOC device demands that there is little need of active characterization and/or control of the device components, both during the fabrication process and during operation. The active characterization and/or control may be avoided if the device and its components are strongly tolerant to fabrication errors, in order to guarantee high fabrication yield, and if they are strongly tolerant to operation variations, such has wavelength drifting and/or temperature variations. Accordingly, the demand for high density and the demand for high tolerances are typically in conflict.

The Applicant found that the present invention finds particularly advantageous application in the context of planar optical waveguides devices, particularly silica based planar optical waveguides devices, wherein the device may comprise three optical waveguides suitably configured to form the above mentioned splitting/combining optical devices and the differential optical delay device.

In particular, the Applicant found that the present invention is particularly useful in the context of high-density circuits in that it allows strong tolerance to fabrication errors to be obtained, even in case of high refractive index contrast.

Applicant found that, in order to meet the above mentioned requirements, the refractive index contrast is advantageously greater than or equal to 1%, preferably greater than 2%. Moreover, the refractive index contrast is advantageously below 4.5%, preferably below 3%.

These values allow a good trade-off between high manufacturing automation, high density, high yield and high tolerance to be obtained.

Typically, the first and the second optical splitting/combining element and the differential optical delay device are arranged so as to form a three-arm Mach-Zehnder interferometer structure.

Typically, the optical device has a through and a cross port having each a respective passband and a respective stopband.

Typically, the passbands of the through and cross ports are consecutive.

The passband of said through port advantageously comprises the second optical band. The passband of said cross port advantageously comprises the first optical band.

The wavelengths belonging to the passband of the through port may all be shorter than the wavelengths belonging to the passband of the cross port, or vice versa, or the two passbands may cross-over. For example, there may be at least one wavelength wherein the two passbands cross-over.

Typically, the wavelengths $\lambda x$ and $\lambda y$ are spaced from one other of at least 100 nm. Advantageously, they are spaced from one other of at least 150 nm or 200 nm.

Typically, the bandwidth of each passband is not lower than 20 nm. For example, the bandwidth of each passband is not lower than 40 nm, 80 nm or 100 nm.

For each of the above bandwidth values, the in-band loss within the second optical band at the through port is advantageously lower than 1 dB, preferably lower than 0.5, and more preferably lower than 0.25 dB.

Advantageously, the in-band loss within the first optical band at the cross port is lower than 3.5 dB.

Advantageously, the isolation of the second optical band with respect to the first optical band at the cross port is higher than 20 dB, preferably higher than 30 dB.

Advantageously, the isolation of the first optical band with respect to the second optical band at the through port is higher than 12 dB.

According to an embodiment, one of the two passbands includes the wavelength of 1310 and the other passband include the wavelength of 1490 nm, 1520 nm and/or 1550 nm.

Typically, the first, second and third optical path of the differential optical delay device have optical lengths $L1$, $L2$, $L3$, respectively, wherein $L3$ is equal to about $L0$, $L2$ is equal to about $L0+\Delta L$ and $L1$ is equal to about $L0+2\Delta L$, wherein $\Delta L$ is equal to $m*\lambda z$.

In a second aspect, the present invention relates to an optical apparatus for splitting/combining a first and a second optical wavelength band, comprising a first and a second optical device according to the first aspect of the invention, optically connected in cascade.

As to the structural and functional features of the optical device according to the first aspect of the invention reference is made to what already disclosed above.

Typically, the first and the second optical device have each an input port, a through port and a cross port.

Preferably, the input port of the second optical device is connected to the through port of the first device.

This advantageously allows, at the through port of the second optical device, higher isolations of the first optical band with respect to the second optical band to be obtained.

According to a variant, the input port of the second optical device is connected to the cross port of the first optical device.

This advantageously allows, at the cross port of the second optical device, higher isolations of the second optical band with respect to the first optical band to be obtained.

According to an embodiment, the optical apparatus further comprises a third optical device according to the first aspect of the invention, having an input port connected to the cross port of the first device.

In a third aspect, the present invention relates to an optical unit comprising
- an optical device for splitting/combining a first and a second optical wavelength band according to the first or second aspect of the invention;
- a receiver optically connected to the optical splitting/combining device and apt to receive a first optical signal having a wavelength within one of the first and second optical band; and
- an optical transmitter optically connected to the optical splitting/combining device and apt to transmit a second optical signal having a wavelength within the other of said first and second optical band.

As to the structural and functional features of the optical device according to the first or second aspect of the invention reference is made to what already disclosed above.

According to an embodiment, the optical unit further comprises a demultiplexer device optically connected to and interposed between the optical device and said optical receiver. The demultiplexer device is advantageously adapted to receive from the optical device and to separate in output said first optical signal and a third optical signal, the third optical signal having wavelength within the same optical band of the first optical signal.

According to this embodiment, the optical unit advantageously comprises a further optical receiver adapted to receive the third optical signal from the demultiplexer device.

Typically, the optical device for splitting/combining a first and a second optical wavelength band comprises a port adapted to be optically connected to an optical transmission line adapted to propagate said optical signals.

Preferably, the optical unit is an IOC device.

In a further aspect, the present invention relates to an optical network comprising a central station, a plurality of terminal stations comprising each an optical unit according to the third aspect of the invention, and a plurality of optical links connecting the terminal stations to the central station.

As to the structural and functional features of the optical unit according to the third aspect of the invention reference is made to what already disclosed above.

BRIEF DESCRIPTION OF THE DRAWINGS

The features and advantages of the present invention will be made apparent by the following detailed description of some exemplary embodiments thereof, provided merely by way of non-limitative examples, description that will be conducted by making reference to the attached drawings, wherein.

DETAILED DESCRIPTION OF THE INVENTION

Figure 1:
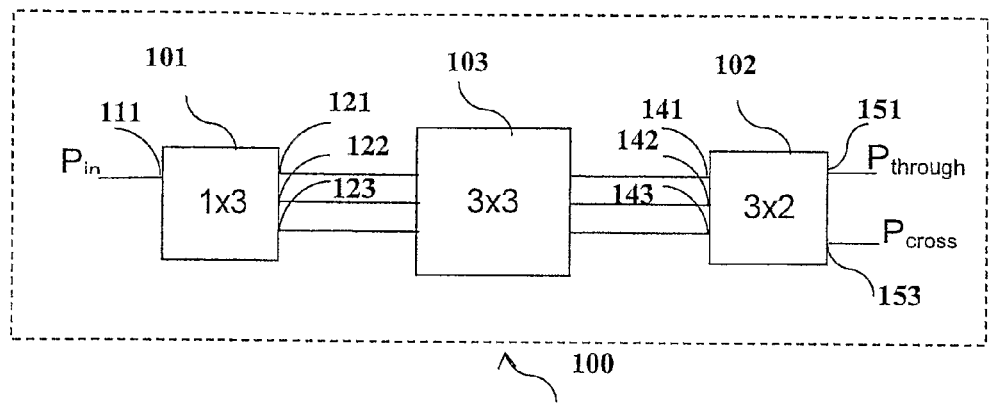
FIG. 1 schematically shows an optical device according to the invention.

FIG. 1 shows an optical device 100 according to the invention for splitting/combining a first and a second optical wavelength band comprising a first and a second optical splitting/combining element 101, 102 optically coupled in cascade and a differential phase delay device 103 optically interposed between them.

Each of the optical splitting/combining element 101, 102 is of the (25-50-25% $\lambda x$)/(0-0-100% $\lambda y$) type and comprises a first, a second and a third optical path, wherein the first optical path is coupled to the second optical path and the second optical path is coupled to the third optical path at a coupling region of the splitting/combining element 101, $\lambda x$ is a wavelength within the first optical band and $\lambda y$ is a wavelength within the second optical band.

For the purpose of the present invention, 'optical path' corresponds, in the more general meaning thereof, to at least one optical mode that may propagate within the optical device.

Typically, the first, second and third optical path are arranged in a substantially parallel configuration, in numerical order.

The optical splitting/combining elements 101, 102 may be any kind of device adapted to implement a (25-50-25% $\lambda x$)/(0-0-100% $\lambda y$) three-optical-path splitting/combining element. For example, they may be evanescent-field couplers (either synchronous or asynchronous), multi-mode interference (MMI) couplers, MZI-based couplers, etc.

The optical splitting/combining elements 101, 102 typically are N×M-port devices wherein for the first optical splitting/combining element 101 N is at least equal to 1 and M is at least equal to 3 while for the second optical splitting/combining element 102 N is at least equal to 3 and M is at least equal to 2.

For the purpose of the present invention, an optical port is defined to correspond, in the more general meaning thereof, to at least one optical mode that may be coupled to one of the optical paths of the respective optical device 101, 102 or 103.

The three optical paths of the optical splitting/combining elements 101, 102 have each two opposed ends, with respect to the coupling region. The optical splitting/combining element 101 comprises at least one input port 111 associated with one of the two opposed ends of the first optical path and three output ports 121, 122, 123 associated with the opposed ends of the three optical paths. The optical splitting/combining element 102 comprises at least three input ports 141, 142, 143 associated with a respective end of the three optical paths and at least two output ports 151, 153 associated with the opposed ends of the first and third optical path (see FIG. 1).

The three output ports 121, 122 and 123 of the first optical splitting/combining element 101 and the three input ports 141, 142, 143 of the second optical splitting/combining element 102 are each optically connected to a respective end of three paths of the optical differential delay device 103. The three paths of the optical differential delay device 103 define the connection between the two splitting/combining elements 102 e 103, and hence their 'input' and 'output' ports.

Throughout the present invention, the terms 'input' and 'output' are used with reference to a conventional direction of propagation of the optical radiation. The present invention also contemplates that, in operation, the optical radiation may propagate through an input port and/or an output port in the opposite direction or in both the directions.

Typically, each of the first and second optical splitting/combining element 101 and 102 has an associated transfer matrix which relates the output ports to the input ports, as well known in the art. An example of a specific transfer matrix is given in eq (1) below.

Advantageously, the second optical splitting/combining element 102 is substantially identical, in its optical response, to the first optical splitting/combining element 101. This is equivalent to say that the second splitting/combining element 102 has the same transfer matrix of the first splitting/combining element 101.

Preferably, the second optical element 102 is substantially identical to the first optical element 101, both in structure and optical response.

Advantageously, the optical splitting/combining element 101 is substantially symmetric with respect to a mirror reflection with respect to a vertical axis thereof (not shown) in FIG. 1.

Advantageously, the optical splitting/combining element 102 is substantially symmetric with respect to a mirror reflection with respect to a vertical axis thereof (not shown) in FIG. 1.

The differential optical delay device 103 comprises a first, a second and a third optical path and is configured to obtain at the input of the second splitting/combining element 102, at a wavelength $\lambda z$ within the first optical band, a phase delay $\Delta\phi$ of $2\pi m$ between an optical radiation propagating through the first optical path and an optical radiation propagating through the second optical path and between the optical radiation propagating through the second optical path and the optical radiation propagating through the third optical path, wherein $m=\pm 1, \pm 2, \pm 3 \ldots$. The wavelength $\lambda z$ may be equal to or different from the wavelength $\lambda x$. Due to the wavelength dependency of the differential optical delay device 103 in the bands of interest, at wavelengths other than $\lambda z$, the differential optical delay device 103 will introduce a phase delay between the first and the second optical path and between the second and the third optical path that will deviate from the value of $2\pi m$, such deviation depending upon the proximity to the wavelength $\lambda z$. The phase delay $\Delta\phi$ is typically the whole phase delay given to the optical radiation propagating from the output of the first splitting/combining element 101 to the input of the second splitting/combining element 102.

It is pointed out that the above mentioned value of phase delay $\Delta\phi$ is to be intended to be equal to the cited value with a tolerance of about 10%, preferably 5%, when the error occurs with the same value on all the optical paths, about 5%, preferably 1%, when the error occurs in an independent way from path to path.

Advantageously, the differential optical delay device 103 is substantially symmetric with respect to a mirror reflection with respect to a vertical axis thereof (not shown) in FIG. 1.

Typically, the first, second and third optical path of the differential optical delay device 103 are arranged in a parallel configuration, in numerical order, and are optically uncoupled.

The differential optical delay device 103 typically is a 3×3-port device. The three optical paths of the differential optical delay device 103 have each two opposed ends, with which the ports of the differential optical delay device 103 are associated.

The ports of the differential optical delay device 103 are respectively optically connected to the three optical output ports 121, 122, 123 of the first optical splitting/combining element 101 and to the three optical input ports 141, 142, 143 of the second optical splitting/combining element 102, as shown in FIG. 1.

Figure 2:
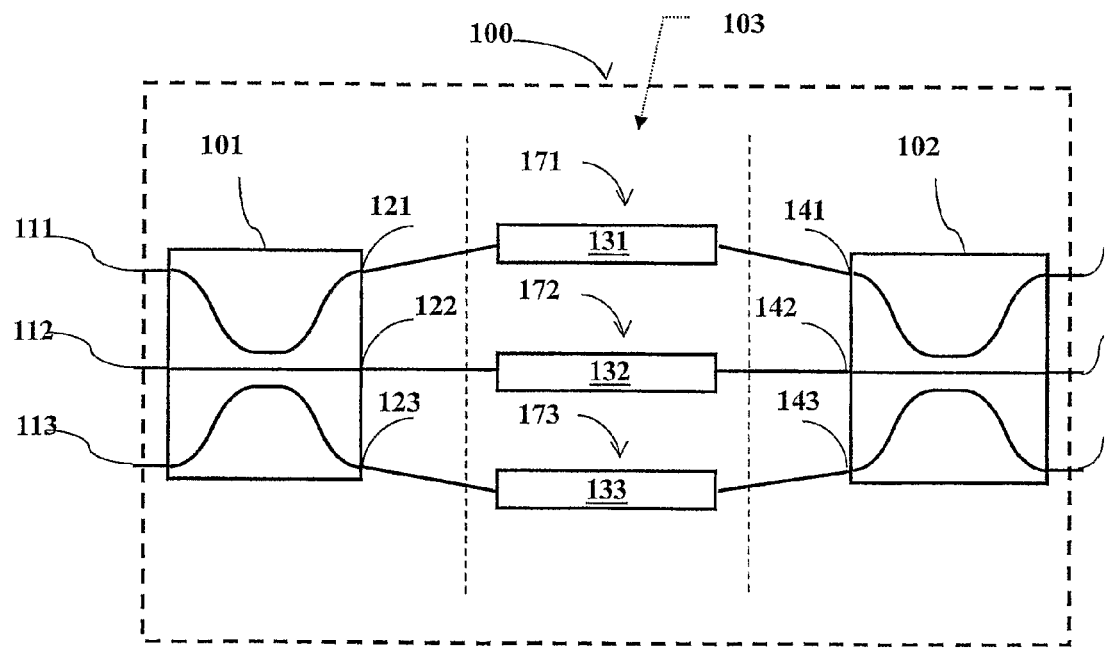
FIG. 2 schematically shows an embodiment of the optical device of FIG. 1.

FIG. 2 shows an embodiment of the device of FIG. 1, wherein the first and the second optical splitting/combining element 101, 102 and the differential optical delay device 103 are arranged so as to form a three-arm Mach-Zehnder interferometer structure comprising two three-path optical couplers and three arms interposed between them.

The Mach-Zehnder interferometer structure may be made, for example, in optical fibre or planar waveguide technology. According to a preferred embodiment, the Mach-Zehnder interferometer structure is formed by three optical waveguides which are suitably coupled to one other at two different locations (coupling regions) so as to form the first and the second optical splitting/combining device 101 and 102.

Exemplarily, the three optical waveguides may be buried, ridge or rib waveguides on a substrate material or they may be photonic crystal waveguides on a substrate material. Advantageously, the core to cladding structure of the three optical waveguides may be made of a combination of optical materials such as $SiO_2$, $Ge:SiO_2$, BPSG, GBSG, SiON, $Si_3N_4$, Si, SiGe, $Al_xGa_{1-x}As$, $In_xGa_{1-x}AsP$, $Cd_xZn_{1-x}Te$, GaN or the like or polymeric materials such as polyimides, acrylates, polycarbonates, silicones, benzocyclobutene (BCB), epoxy resins or the like. Preferably, the cladding of the waveguides is made of silica or silica-based material and the core is made of germanium-doped silica on a silicon or SOI substrate.

In the embodiment of FIG. 2 the three optical paths of the optical splitting/combining elements 101, 102 correspond to the three paths of the two couplers of the Mach-Zehnder interferometer and the three optical paths of the differential optical delay device 103 correspond to the three arms 171, 172 and 173 of the Mach-Zehnder interferometer structure. In the figure, each interferometer arm 171, 172 and 173 is depicted as including a respective optical device 131, 132 and 133.

The optical devices 131, 132 and 133 may be any kind of device adapted to obtain at a wavelength $\lambda z$ within the first optical band the above mentioned phase delay $\Delta\phi$ of $2\pi m$ between the first and the second optical path and between the second and the third optical path. For example, the optical devices 131, 132 and 133 comprise optical fibres or planar waveguides having different optical paths (e.g. different physical lengths or different propagation constants) such as to obtain the above mentioned phase delay $\Delta\phi$.

Figure 3:
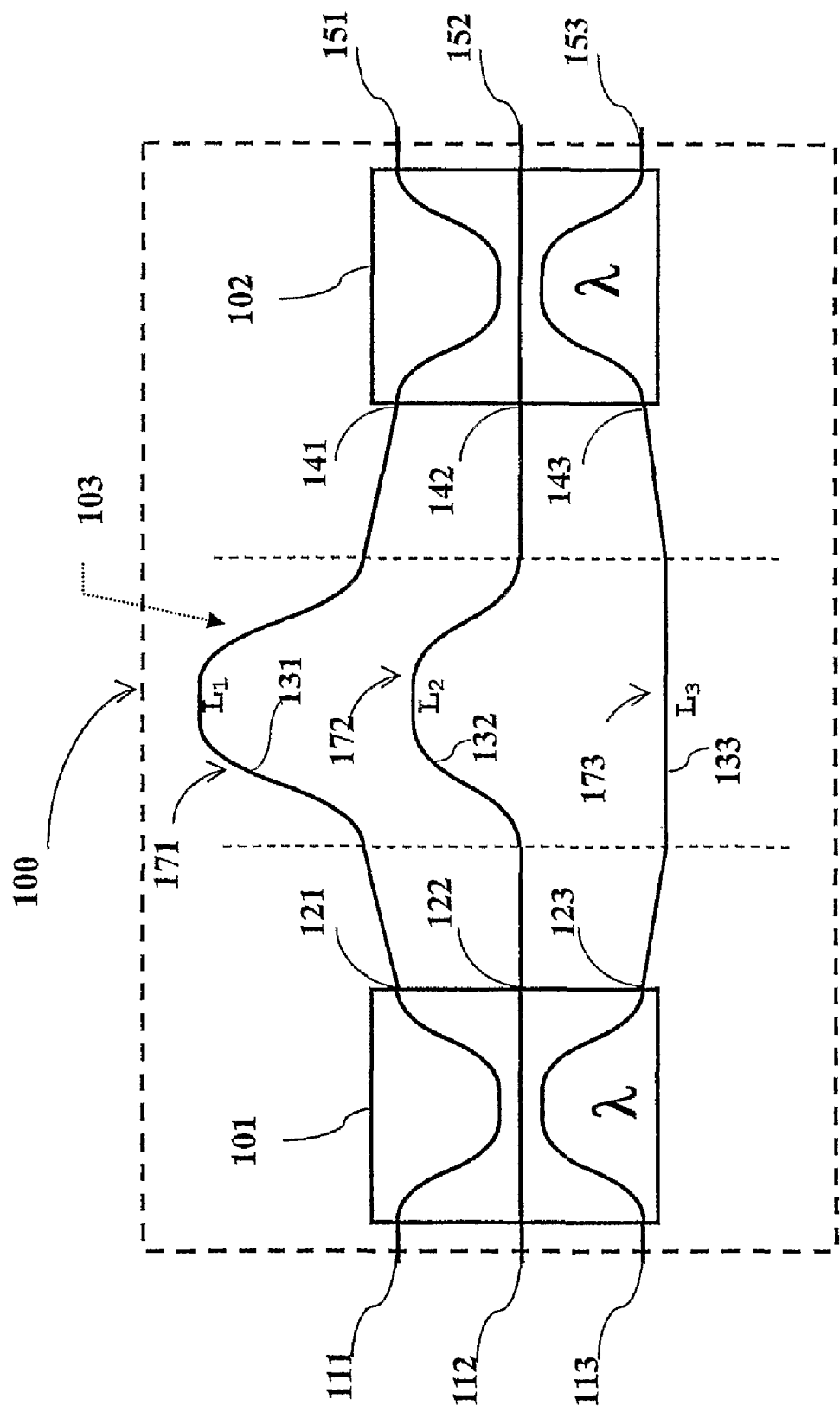
FIG. 3 schematically shows an embodiment of the optical device of FIG. 2.

For example, in the embodiment shown in FIG. 3, the optical devices 131, 132 and 133 comprise optical fibres or planar waveguides having different physical lengths. In order to obtain at a wavelength $\lambda z$ within the first optical band the above mentioned phase delay $\Delta\phi$ of $2\pi m$ between the first and the second optical path and between the second and the third optical path, the following conditions are advantageously met: L3=L0; L2=L0+$\Delta$L and L1=L0+2$\Delta$L, wherein $\Delta L = m^* \lambda z$ and L1, L2, L3 are the optical lengths of the first, second and third optical path, respectively.

In the embodiments shown in FIGS. 2 and 3, the first and second optical splitting/combining element 101, 102 are 3×3 port devices, the ports of which are indicated in the figures with the reference numbers 111, 112, 113, 121, 122, 123, 141, 142, 143, 151, 152, 153.

The optical ports 111, 151, 153 are, for example, the input port, the through port and the cross port, respectively, of the optical device 100.

For example, considering an input optical power received at the input port 111, the splitting/combining element 101 is such that at wavelength $\lambda x$ an output power fraction of about 25% is coupled into the output port 121, an output power fraction of about 50% is coupled into the output port 122, and an output power fraction of about 25% is coupled into the output port 123 while at wavelength $\lambda y$ about 100% of the output power is coupled into the output port 123. Moreover, considering an input optical power received at the central input port (e.g. the port 112), the splitting/combining element 101 is such that at wavelength $\lambda x$ an output power fraction of about 50% is coupled into the output port 121, an output power fraction of about 50% is coupled into the output port 123, and substantially 0% of the output power is coupled into the output port 122 and that at wavelength $\lambda y$ about 100% of the output power is coupled into the output port 122.

Moreover, as far as the optical field phase is concerned, the optical splitting/combining element 101 is such as to obtain, for a radiation at least a wavelength $\lambda w$ comprised in the first optical band received at the input port 111, a phase difference $\Delta\phi$ of about $+(\pi/2)+2K_1\pi$ [or, $-(\pi/2)+2K_1\pi$] between the radiation at the output port 122 and the radiation at the output port 121, and of about $+\pi+2K_2\pi$ [or, $-\pi+2K_2\pi$] between the radiation at the output port 123 and the radiation at the output port 121, where $K_1$ and $K_2$ are two integer numbers; and for a radiation at said at least one wavelength $\lambda w$ received at the central input port 112, a phase difference $\Delta\phi$ of about $+(\pi/2)+2K_3\pi$ [or, $-(\pi/2)+2K_3\pi$] between the radiation at the output port 121 and the radiation at the output port 122, and $+\pi/2+2K_4\pi$ [or, $-(\pi/2)+2K_4\pi$] between the radiation at the output port 123 and the radiation at the output port 122, where $K_3$ and $K_4$ are two integer numbers.

It is noted that, considering a radiation received at an input port of the splitting/combining element, the phase difference $\Delta\phi$ introduced between a couple of output ports typically has the same sign than the phase difference $\Delta\phi$ introduced between the other couple of output ports.

Moreover, it is noted that when the propagation constants of the three optical paths of the splitting/combining element are ideally identical (e.g., in case of a splitting/combining element based on three coupled waveguides having identical cross-section and core-to-cladding refractive index), the above mentioned values of phase difference $\Delta\phi$ are wavelength independent. That is, they are ideally the same at any wavelength comprised at least in a band of interest.

Further, as already mentioned above, the optical splitting/combining element 101 is preferably symmetric with respect to a mirror reflection with respect to a vertical axis thereof (i.e., the optical input ports 111, 112, 113 and the optical output ports 121, 122, 123 are respectively interchangeable).

The second optical splitting/combining element 102 is preferably structurally and functionally identical to the first splitting/combining element 102.

It is noted that the total transfer function of the optical device 100 depends on how the phase difference introduced by the splitting/combining elements 101 and 102 combines with the phase difference introduced by the optical differential delay device 103. Therefore, the present invention also contemplates the case wherein the optical splitting/combining elements 101 and 102 might be such that the above-mentioned phase differences take different values from those mentioned above, provided that the phase delay induced by the optical differential delay device 103 is changed accordingly. Therefore, as an example, the present invention may comprises the case in which the coupling mechanism inside the splitting/combining element 101 (e.g. an asynchronous coupler) is such that at the outputs of the coupling region thereof the above-mentioned coupling ratio is obtained while the phase differences of the respective output optical radiations deviate from the values mentioned above. In such a case, either in the splitting element 101 or in the differential phase delay element 103, a phase delay adjustment with respect to the values ($2m\pi$) defined above will be set so as to take into account the above-mentioned deviation.

The [(25-50-25%$\lambda x$)/(0-0-100%$\lambda y$)] splitting/combining element 101 and 102 are advantageously designed in such a way that the amplitude and the phase of the optical fields at the output ports 121, 122, 123 and 151, 152, 153 are related to the optical fields at the input ports 111, 112, 113 and 141, 142, 143, respectively, by the following expression (hereinafter referred to as eq. (1)):

$$\begin{pmatrix} b_1 \\ b_2 \\ b_3 \end{pmatrix} = \begin{pmatrix} c_1 + \frac{1}{2} & c_2 & c_1 - \frac{1}{2} \\ c_2 & 2c_1 & c_2 \\ c_1 - \frac{1}{2} & c_2 & c_1 + \frac{1}{2} \end{pmatrix} \begin{pmatrix} a_1 \\ a_2 \\ a_3 \end{pmatrix},$$

where:
$a_1$, $a_2$ and $a_3$ are the optical fields at the ports 111, 112 and 113, respectively, of the first splitting/combining element 101, and at the ports 141, 142 and 143, respectively, of the second splitting/combining element 102; and $b_1$, $b_2$ and $b_3$ are the optical fields at the ports 121, 122 and 123, respectively, of the first splitting/combining element 101, and at the ports 151, 152 and 153, respectively, of the second splitting/combining element 102;

$$-c_1 = \frac{1}{2}\cos\phi(\lambda), \quad c_2 = -\frac{j}{\sqrt{2}}\sin\phi(\lambda),$$

wherein $\phi(\lambda)$ is a characteristic function of the splitting/combining element.

In particular, $\phi(\lambda)=q\pi$ at wavelength $\lambda y$, where $q=1, 2, 3 \ldots$, and $\phi(\lambda)=\pi/2+p\pi$ at wavelength $\lambda x$, where $p=0, 1, 2 \ldots$.

Moreover, $\phi(\lambda)$ is related to the splitting/combining element structure as follows: $\phi(\lambda)=\sqrt{2}\kappa(\lambda)L$, where L is the coupling length (including the effect of the transition regions—S-bends) and $\kappa(\lambda)$ is the coupling coefficient of the splitting/combining element.

The 3×3 matrix of eq (1) is a preferred form of the transfer matrix associated to the optical splitting/combining elements 101, 102. It is noted that the matrix in eq (1) is equal to its transpose matrix (i.e. the off-diagonal coefficients are mutually equal). This is equivalent to say that the optical splitting/combining element of eq (1) is symmetric with respect to a mirror reflection with respect to a vertical axis thereof (the optical input ports 111, 112, 113 and 141, 142, 143 and the optical output ports 121, 122, 123 and 151, 152, 153 are respectively interchangeable).

Let it be assumed that an optical field is fed to the first splitting/combining element 101 through one of the ports 111 or 113 (see FIG. 2 or 3). From eq. (1), where $a_1=1$, $a_2=0$ and $a_3=0$, or $a_1=0$, $a_2=0$ and $a_3=1$, it can be derived that at the wavelength $\lambda x$ the splitting/combining element 101 splits about 50% of the optical power into the port 122, and about 25% of the input power into each of the two ports 121 and 123, whereas at the wavelength $\lambda y$ the splitting/combining element 101 addresses about 100% of the optical power into the opposite port 123 or 121. Similarly, the optical power of an optical field fed to the second splitting/combining element 102 through one of the ports 141 or 143 at the wavelength $\lambda x$ is split about 50% into the port 152, and about 25% into each of the two ports 151 and 153, whereas at the wavelength $\lambda y$ about 100% of the optical power is directed to the opposite ports 153 or 151.

Moreover, the fraction of optical field at wavelength $\lambda x$ that is fed to the second splitting/combining element 102 through the port 142 ($a_2=1$, $a_1=a_3=0$), is split about 50% into each of the ports 151 and 153, and substantially 0% of the optical power is made available at the port 152.

Furthermore, about 100% of a possible fraction of optical field at wavelength $\lambda y$ which enters the second splitting/combining element 102 through the port 142 ($a_2=1$, $a_1=a_3=0$), is directed to the port 152.

As to the operation of the optical splitting/combining device 100 according to the invention, when an input optical signal comprising a radiation at wavelength $\lambda x$ and a radiation at wavelength $\lambda y$ enters one of two outer optical input ports 111 and 113 (e.g. port 111), the optical splitting/combining element 101 is adapted to receive and split said signal into three optical fields, according to the above mentioned power splitting ratios, the optical differential delay device 103 is adapted to propagate and differentially delay the three optical fields as disclosed above and the optical splitting/combining element 102 is adapted to recombine them, according to the above mentioned power splitting ratios, so as to obtain at the through port (e.g. port 151) of the optical device 100 substantially the whole output power of the radiation at wavelength $\lambda y$ and at the cross output port (e.g. port 153) substantially the whole output power of the radiation at wavelength $\lambda x$.

FIGS. 4-11 and 15 show the results of simulations carried out by the Applicant in order to show the performance of the optical device according to the invention. As a non limiting example, the simulation were carried out considering three-path splitting/combining elements and differential optical delay device realized by three waveguides having a core-cladding refractive index contrast $\Delta n=2.5\%$; a core 2.6 μm high and 2.6 μm wide, a wall-to-wall spacing between the coupled waveguides in the coupling region 2.7 μm wide and a coupling length L of 1195 μm (including the effect of the transition regions).

Figure 4:
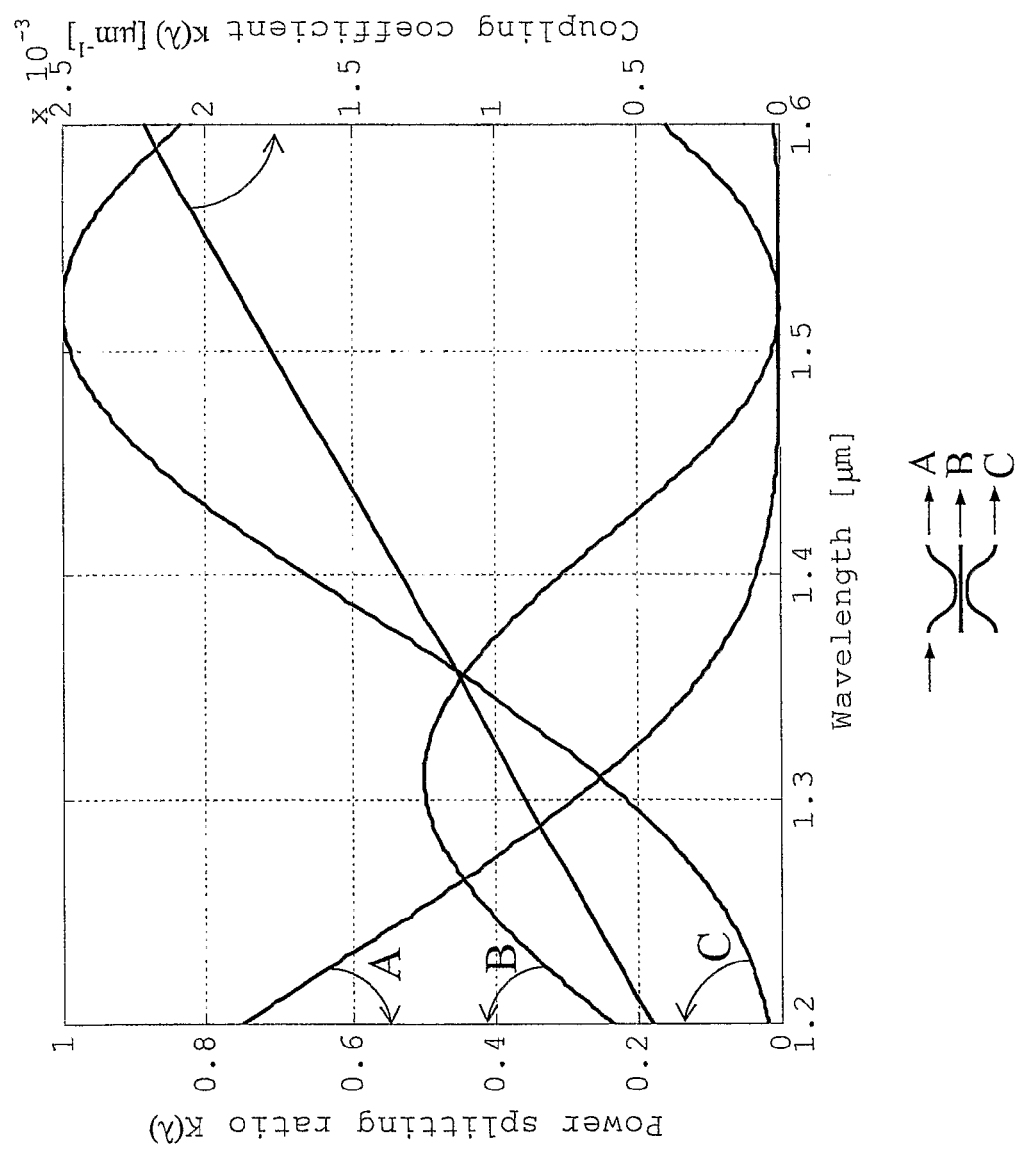
FIG. 4 shows simulation results of the spectral dependence of the power splitting ratio K of a three-path splitting/combining element adapted to be used in the optical device of the invention, and of the corresponding coupling coefficient $\kappa(\lambda)$.

In particular, FIG. 4 shows simulation results of the spectral dependence of the coupling coefficient $\kappa(\lambda)$ and of the power splitting ratio K of a three-path splitting/combining element of the type shown in FIG. 2 or 3, as deduced by eq. (1). FIG. 4 schematically shows also the ports of the splitting/combining element taken into account in the simulations. A indicate the through port while B the central port and C the cross port.

Figure 5:
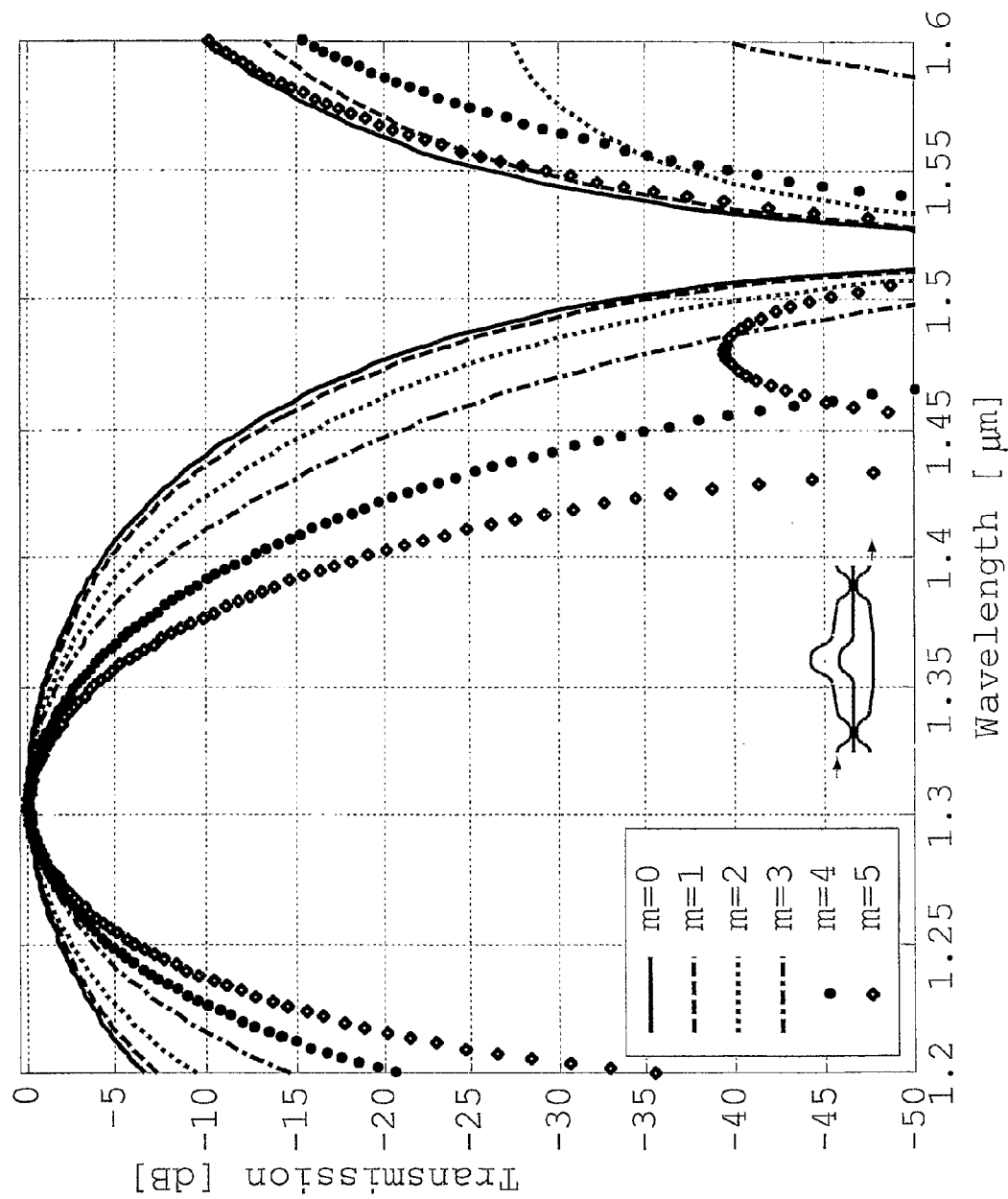
FIG. 5 shows simulation results of the transfer function at the cross-port of an optical device according to the invention, obtained for different m values, $\lambda x=\lambda z=1310$ nm and $\lambda y=1520$ nm.
Figure 6:
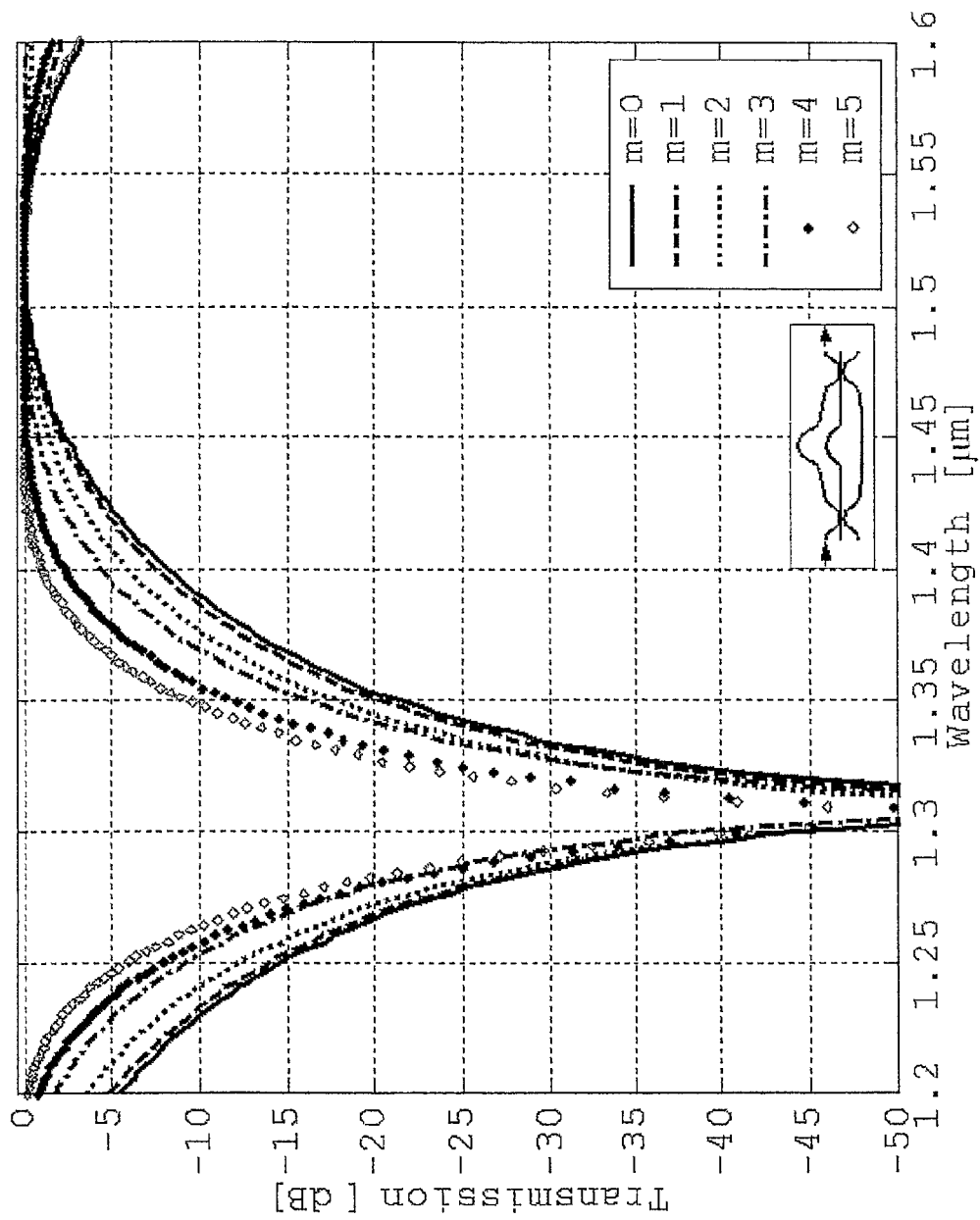
FIG. 6 shows simulation results of the transfer function at the through-port of an optical device according to the invention, obtained for different m values, $\lambda x=\lambda z=1310$ nm and $\lambda y=1520$ nm.
Figure 7:
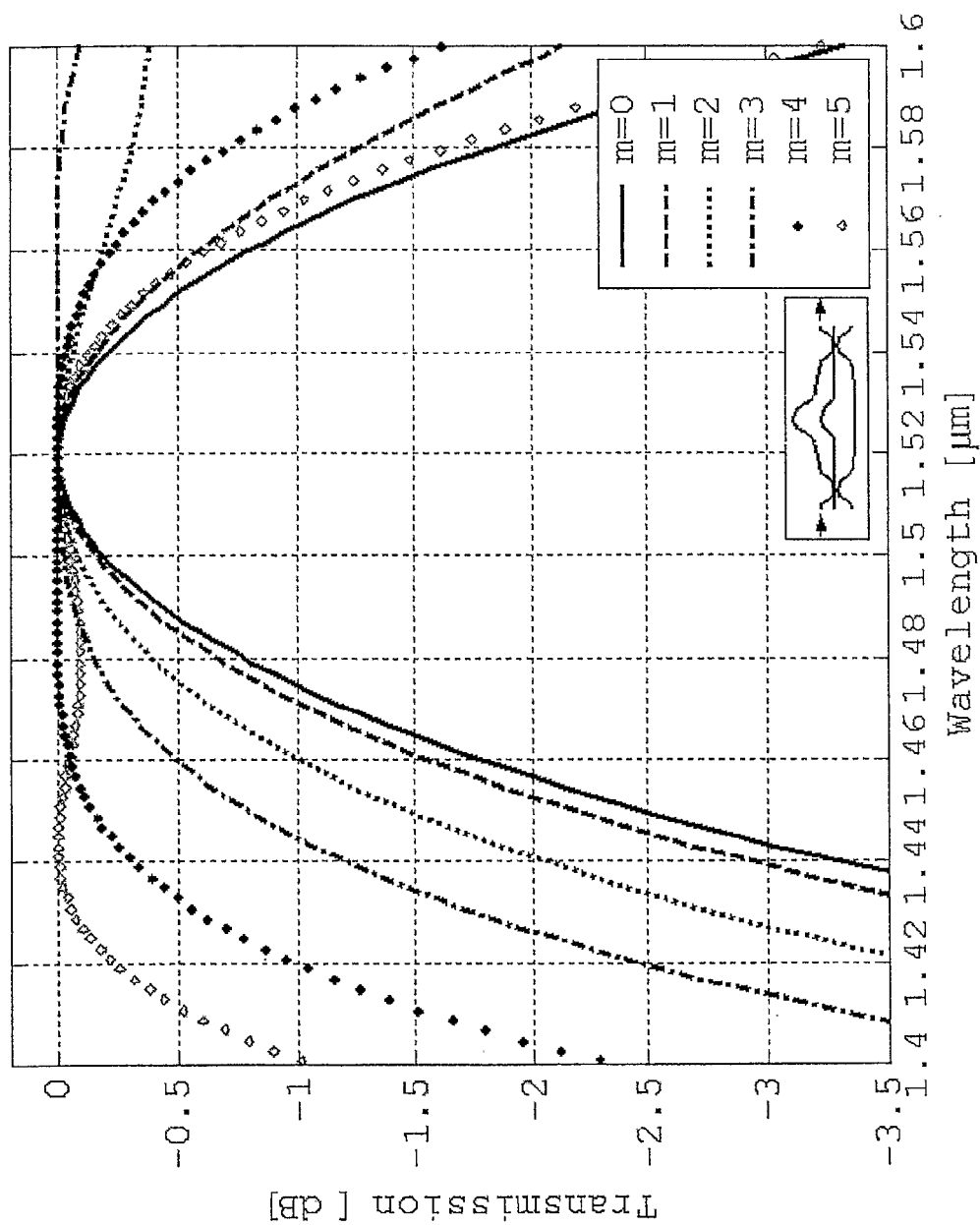
FIG. 7 shows the simulation results of the transfer function of FIG. 6 in a limited range of wavelengths.

FIGS. 5-7 shows simulation results of the total transfer function at the cross port (FIG. 5) and at the through port (FIGS. 6 and 7) of an optical device designed according to the invention, for different values of the parameter m. As a non limiting example, the simulations were carried out considering a device realized by three waveguides having the above mentioned features, a wavelength depending coupling coefficient $\kappa(\lambda)$ as shown in FIG. 4 and splitting/combining elements optimized in order to obtain $\phi(\lambda)=\pi/2$ at the wavelength $\lambda x=1310$ nm, $\phi(\lambda)=\pi$ at the wavelength $\lambda y=1520$ nm, $\Delta L=m\lambda z$, for m ranging from 0 to 5 and with $\lambda z=\lambda x=1310$ nm. That is, the simulations were performed by considering splitting/combining elements of the (25-50-25%)1310 nm/(0-0-100%)1520 nm type.

From FIG. 5, it can be noted that the transfer function at the cross port has a wide passband centred at about $\lambda x=1310$ nm and a stopband centred at about $\lambda y=1520$ nm. As m increases up to an optimal range of values, the passband narrows and the stopband widens so that isolation of a sub-band comprising the $\lambda y=1520$ nm radiation (e.g. $\lambda y=1520\pm40$ nm) with respect to a sub-band comprising the $\lambda x=1310$ nm radiation (e.g. $\lambda y=1310\pm50$ nm) increases.

From FIGS. 6 and 7, it can be noted that the transfer function at the through port has a passband centred at about $\lambda y=1520$ nm and a stopband centred at about $\lambda x=1310$ nm. As m increases up to an optimal range of values, the passband notably flatten and the in-band loss reduces; consequently, the stop band gets narrower and the isolation of a sub-band comprising the $\lambda x=1310$ nm radiation (e.g. $\lambda x=1310\pm50\pm40$ nm) with respect to a sub-band comprising the $\lambda y=1520$ nm radiation (e.g. $\lambda y=1520\pm40$ nm) reduces.

Notwithstanding the fact that as m varies a fine adjustment of the design parameters (e.g. $\lambda x$, $\lambda y$, $\lambda z$) is generally needed in order to optimise the overall response of the optical device 100 with respect to those illustrated in FIG. 5-7, it can be noted that at the through port the passband comprising $\lambda y=1520$ assumes more flattened shape for m=2 to 5, preferably m=3 or m=4.

FIGS. 5-7 thus shows that a suitable choice of m allows, at the through port of the device, the passband wherein $\lambda y$ is comprised to be optimally widened and flattened and, at the cross port of the device, the stopband wherein $\lambda y$ is comprised to be optimally widened.

In particular, a suitable choice of m allows, at the through port of the device, the in-band loss within a sub-band including λy to be minimized and, at the cross port, the isolation of the sub-band including λy with respect to a sub-band including λx to be maximized.

For example, after said the above mentioned fine adjustment of the design parameters (e.g., λx, λy, λz, etc.) in order to optimise the overall response of the optical filter 100, for m=3 or 4 in-band loss values of 0.17 and 0.23 dB, respectively, can be obtained at the through port within the 1520±40 nm sub-band. Moreover, for m=3 or 4 an isolation at the cross port of the 1520±40 nm sub-band with respect to the 1310±50 nm sub-band of the value of 30 and 28 dB, respectively, can be obtained.

Depending on the applications, the optical device can be designed in order to have at the through and cross ports the desired radiation wavelengths. For example, in a FTTP application, wherein the in-band loss requirement in the 1520±40 nm band are very demanding, the optical device can be designed in order to have at the through port radiations in the 1520±40 nm band and at the cross port radiations in the 1310±50 nm band (as in the embodiment shown with reference to FIG. 8). Moreover, in order to obtain at the through port higher isolation values of the 1310±50 nm band with respect to the 1520±40 nm band, a cascaded architecture of the proposed optical device can be used, as shown below with reference to FIG. 12.

Figure 8:
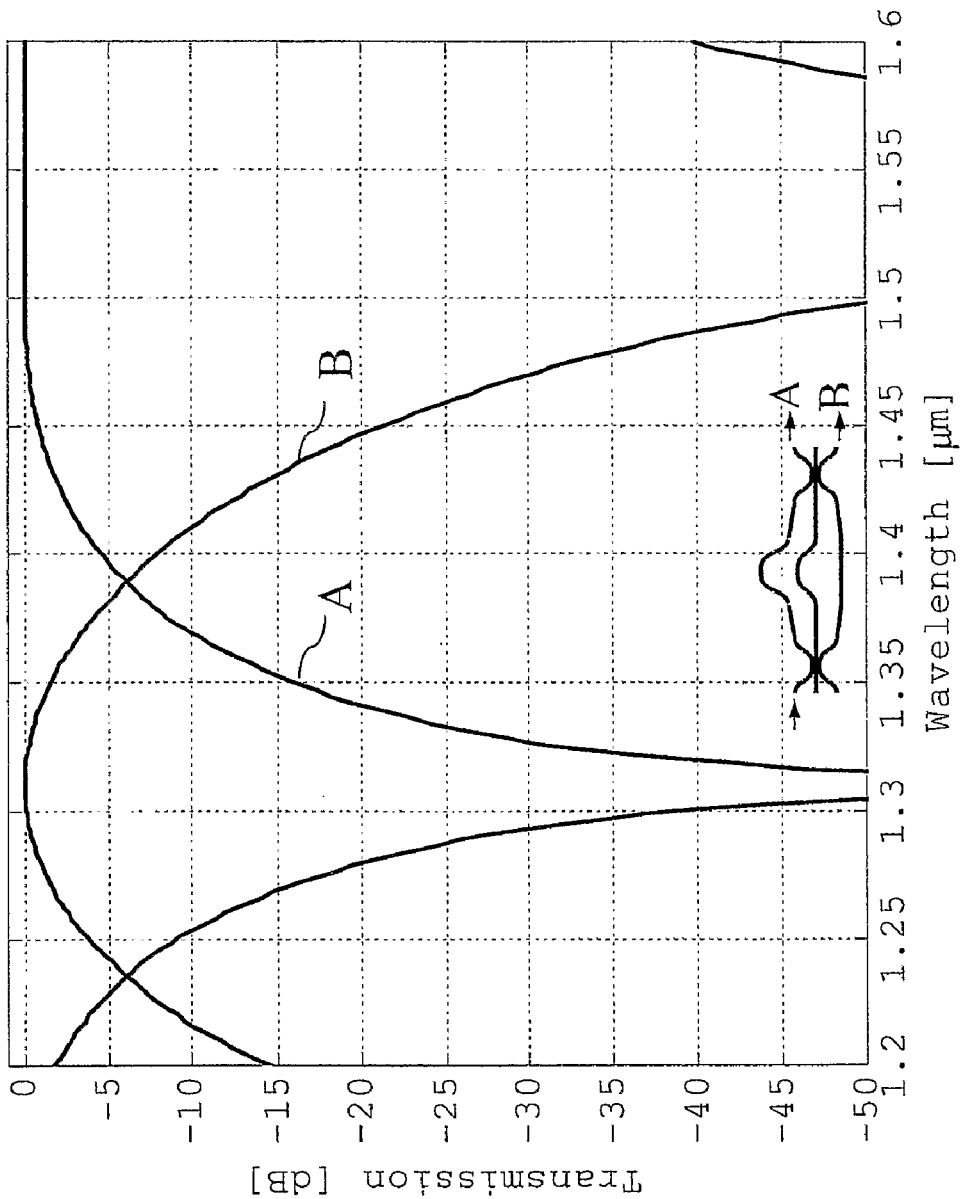
FIG. 8 shows simulation results of the transfer function both at the through-port and cross-port of an optical device according to the invention, obtained for m=3, $\lambda x=\lambda z=1310$ nm and $\lambda y=1520$ nm.
Figure 9:
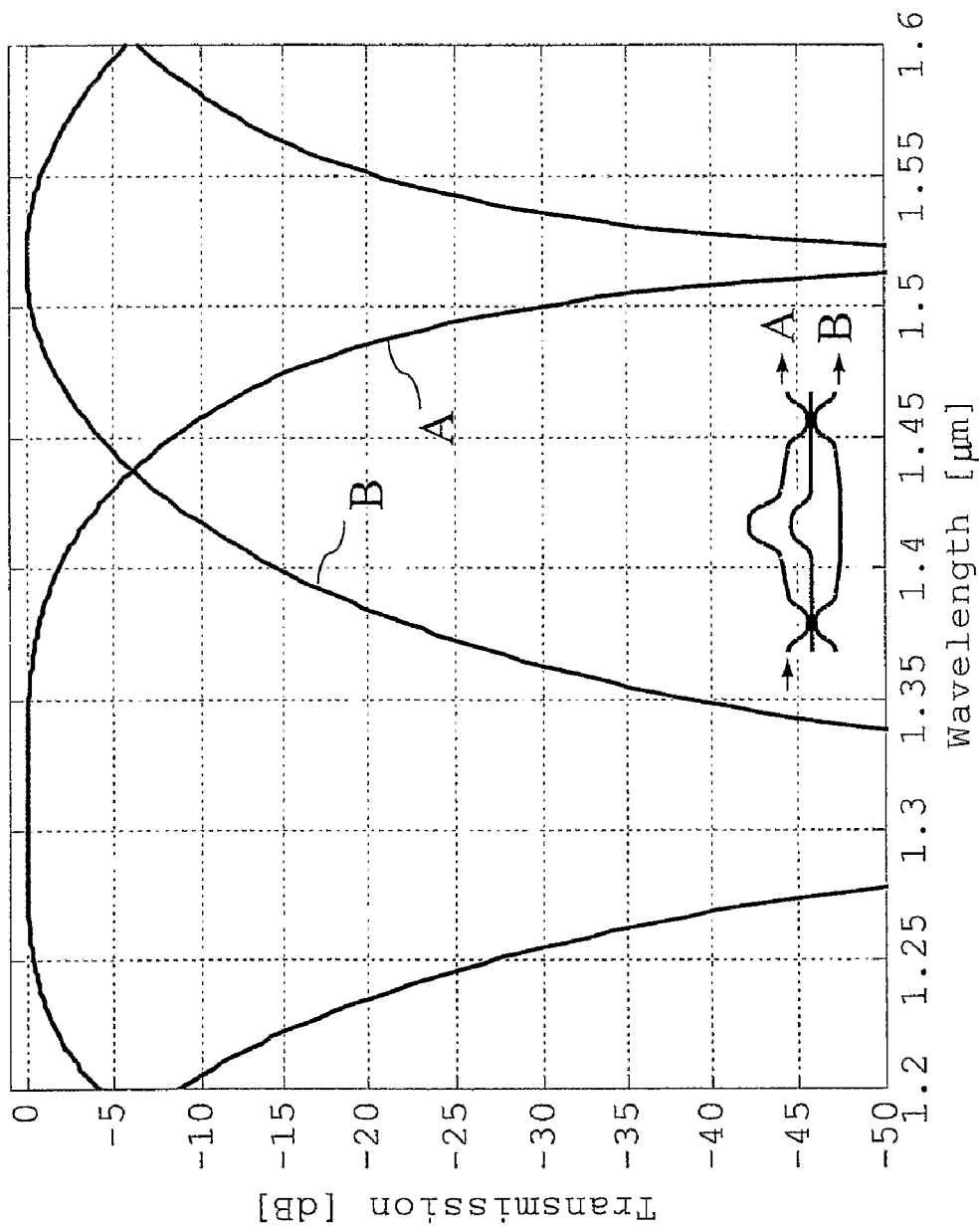
FIG. 9 shows simulation results of the transfer function both at the through-port and cross-port of an optical device according to the invention, obtained for m=3, $\lambda x=\lambda z=1520$ nm and $\lambda y=1310$ nm.

FIGS. 8 and 9 show simulation results of the transfer function of both the through port (A) and the cross port (B) of an optical device exemplarily designed according to the invention for m=3 and considering both an optical device with splitting/combining elements of the type (25-50-25%)1310 nm/(0-0-100%)1520 nm (FIG. 8) and an optical device with splitting/combining elements of the type (25-50-25%)1520 nm/(0-0-100%)1310 nm (FIG. 9).

As a non limiting example, the simulations were carried out considering $\phi(\lambda x)=\pi/2$ for $\lambda x=1310$ nm, $\phi(\lambda y)=\pi$ for $\lambda y=1520$ nm, and optical $\Delta L=3\lambda z=3\lambda x$ (FIG. 8) and $\phi(\lambda x)=3\pi/2$ for $\lambda x=1520$ nm, $\phi(\lambda y)=\pi$ for $\lambda y=1310$ nm, and optical $\Delta L=3\lambda z=3\lambda x$ (FIG. 9).

As clear from the transfer functions of FIGS. 5-9, the optical device according to the invention is apt to split an optical radiation $P_{in}$, e.g. at the port 111, into two output optical radiations $P_{through}$ and $P_{cross}$, e.g. at the through and cross port 151, 153, respectively, having each a respective power spectrum. In particular, the optical device 100 according to the invention is apt to split/combine a first and a second optical wavelength band in that, considering a large spectrum optical radiation comprising two optical bands as the input optical radiation $P_{in}$, when comparing the two output power spectra $P_{through}$ and $P_{cross}$ normalized at their maximum intensity the power spectrum of the cross output radiation $P_{cross}$ shows at each wavelength of the first band an optical power greater than the optical power at the same wavelength in the power spectrum of the through output radiation $P_{through}$. Similarly, the through output radiation ($P_{through}$) power spectrum shows at each wavelength of the second band an optical power greater than the optical power at the same wavelength in the power spectrum of the cross output radiation $P_{cross}$. In other words, at any wavelength of, e.g., the first optical band, the optical power outputting from one of the output ports is more than half of the total output power outputting from the output ports of the splitter/combining element at the given wavelength.

The wavelengths belonging to the first optical band may be shorter than the wavelengths belonging to the second optical band, or vice versa. For the purpose of the present invention, each of the first and the second optical band is a continuous optical band, i.e. it is not contemplated the case wherein the first and second optical band are spectrally interleaved. Typically it may exists at least one wavelength wherein the two power spectra cross-over. This wavelength is a separation wavelength between the two bands (see e.g. FIG. 8 or 9).

The first and the second optical band are wide bands, in that each of them has a continuous bandwidth greater than or equal to 10 nm. For example the bandwidth of at least one of them may be greater than or equal to 20 nm, or greater than or equal to 35 nm, or more typically greater than or equal to 50 nm. Preferably, the first and the second optical band contain the wavelengths of 1310 nm and 1520 nm, respectively or in inverse order.

Figure 10:
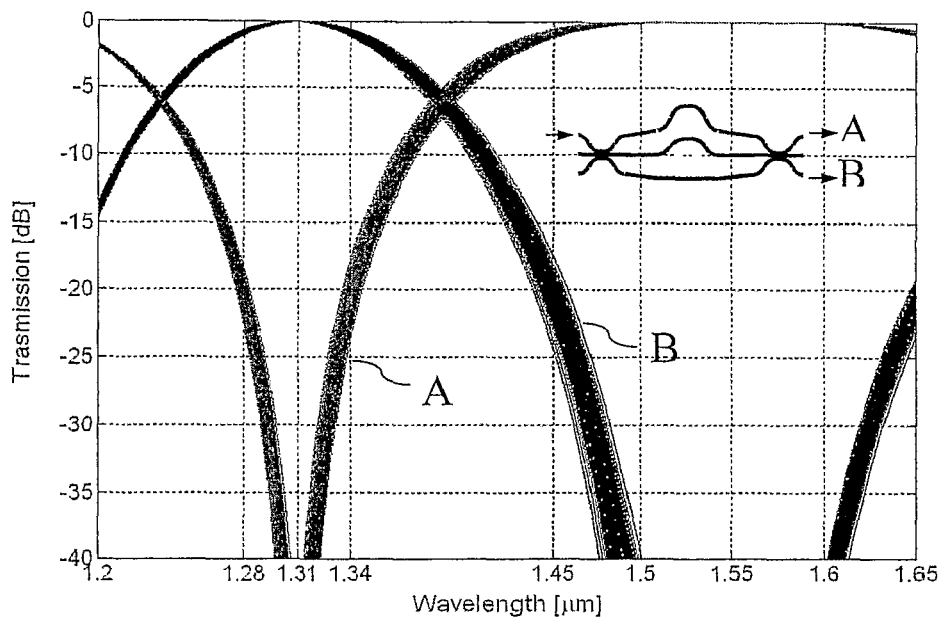
FIG. 10 shows simulation results of the transfer function obtained for a set of one hundred optical devices of the type shown in FIG. 8, wherein the power splitting ratio K of each optical splitting/combining element is varied around a nominal value according to a Gaussian distribution.
Figure 11:
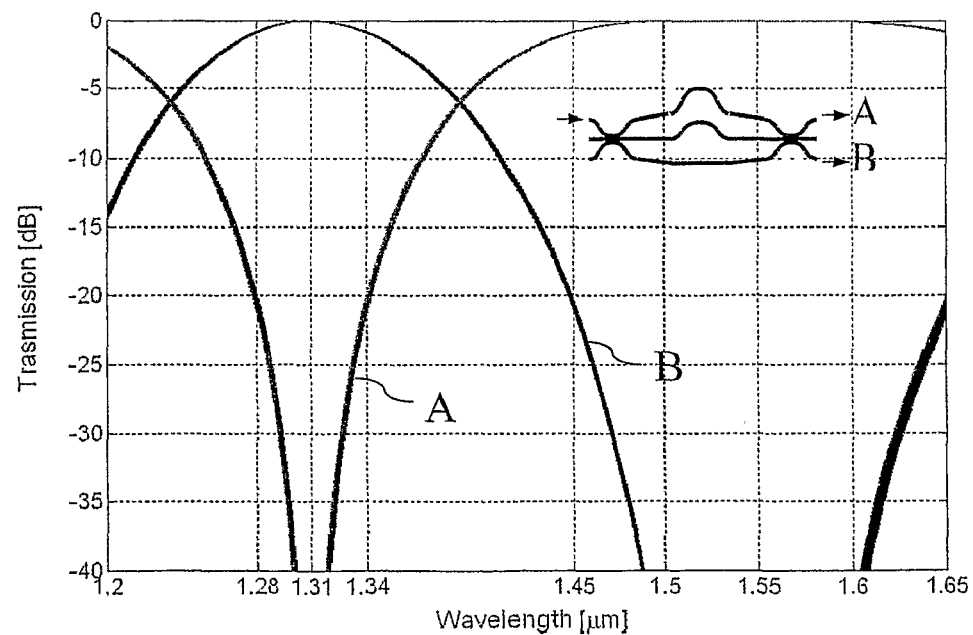
FIG. 11 shows simulation results of the transfer function obtained for a set of one hundred optical devices of the type shown in FIG. 8, wherein the length of each optical path of the differential phase delay device of the optical devices is varied around a nominal value according to a Gaussian distribution.

FIGS. 10 and 11 show simulation results of the transfer function obtained for a set of one hundred optical devices of the type shown in FIG. 8, wherein structural parameters of the optical devices are varied around a respective nominal value, according to a Gaussian distribution. The structural parameters taken in consideration for statistical variation are the power splitting ratio K of the optical splitting/combining elements (FIG. 10) and the length of the optical paths of the differential delay device (FIG. 11). In particular, a variation δK/K with respect to a nominal value $K_n$ has been considered ($K=K_n(1+\delta K/K)$) for each splitting/combining element, with a standard deviation $\sigma_k=1.9*10^{-2}$, and a variation δL/L with respect to a nominal value $L_n$ has been considered ($L=L_n(1+\delta L/L)$) for each optical path of the differential delay device, with a standard deviation $\sigma_L=1*10^{-3}$.

Table 1 below shows a comparison between the performances of the optical device in absence and in presence of errors (worse case). In third, fourth and fifth column B1 and B2 are the bandwidth centred at 1550 nm and 1310 nm, respectively, wherein the in-band loss and isolation values were calculated.

TABLE 1

|  | Filter | $B_1 = 100$ nm | $B_1 = 200$ nm | $B_2 = 60$ nm |
|---|---|---|---|---|
| In-band losses | Ideal | <0.05 dB | <0.05 dB | <1 dB |
| Isolation | Ideal | >50 dB | >20 dB | >19 dB |
| In-band loss | Couplers error (FIG. 10) | <0.09 dB | <1.25 dB | <1.2 dB |
| Isolation | Couplers error (FIG. 10) | >40 dB | >16 dB | >17 dB |
| In-band loss | Path error (FIG. 11) | <0.07 dB | <1 dB | <1 dB |
| Isolation | Path error (FIG. 11) | >42 dB | >19 dB | >18.6 dB |

FIGS. 10, 11 and Table 1 show that the optical device according to the invention allows strong tolerance to manufacturing deviations to be achieved. It is noted that such strong tolerance have been obtained considering a high core-cladding refractive index contrast Δn (Δn=2.5%) of the waveguides making the device.

Therefore, as already mentioned above, by allowing strong tolerance to fabrication errors to be obtained, even in case of high refractive index contrast, the present invention is particularly useful in the context of high-density circuits.

Figure 12:
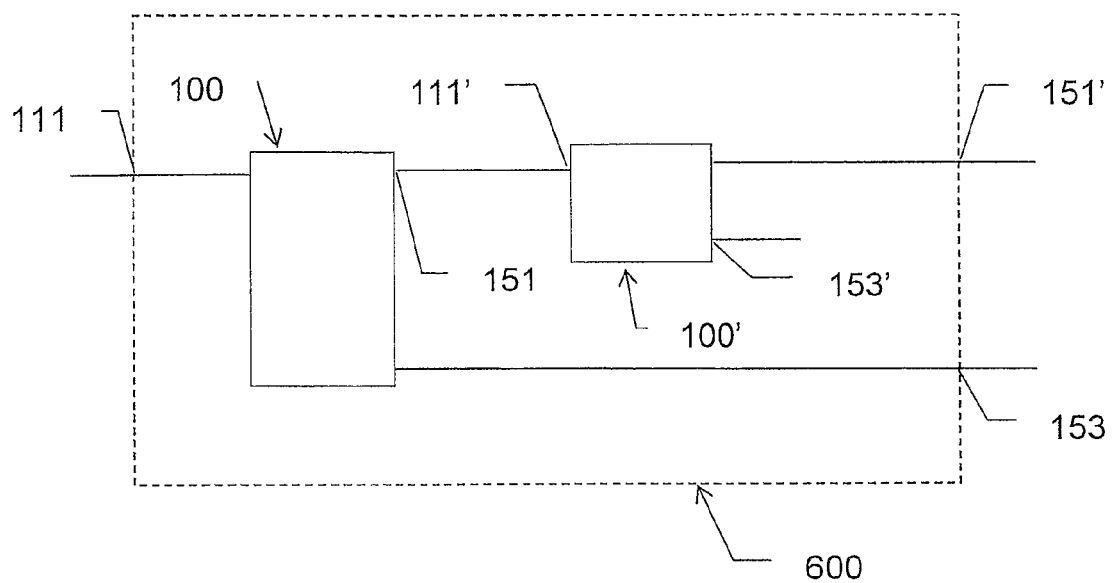
FIG. 12 shows a schematic diagram of an optical apparatus comprising two optical device optically connected in cascade according to the invention.

FIG. 12 shows an optical apparatus 600 for splitting/combining a first and a second optical wavelength band, comprising a first and a second optical device 100, 100' according to the invention, optically connected in cascade. In particular, in the embodiment shown, the through port 151 of the first optical device 100 is connected to the input port 111' of the second optical device 100'. Moreover, the input port 111 of the first optical device 100 corresponds to the input port of the apparatus 600, the cross port 153 of the first optical device 100 corresponds to the cross output port of the apparatus 600 and the through port 151' of the second optical device 100' corresponds to the through output port of the apparatus 600.

The embodiment shown allows, at the through port 151' of the second optical device 100', the isolation of the first optical band with respect to the second optical band to be increased.

Figure 15:
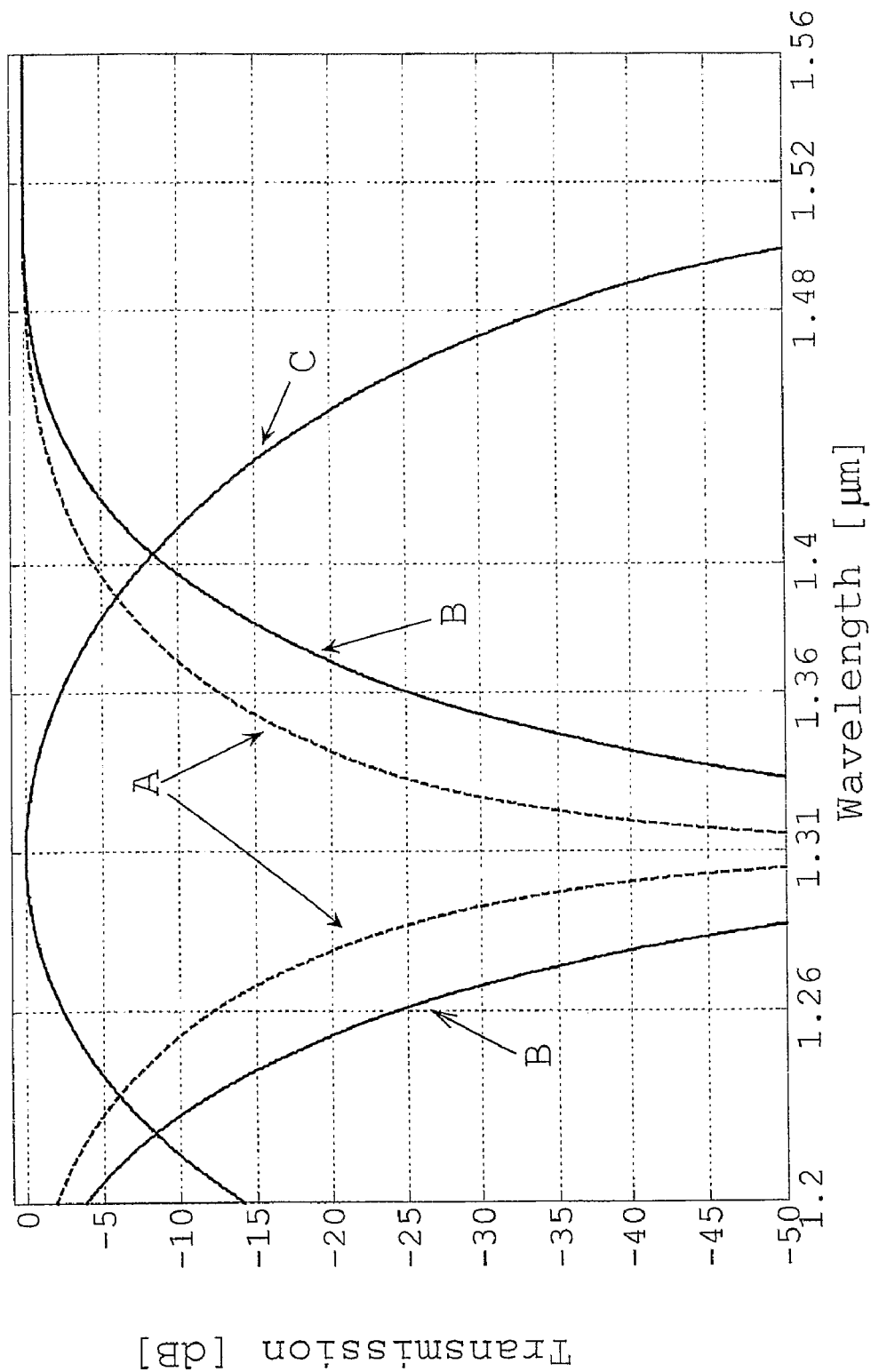
FIG. 15 shows simulation results of the transfer function at the through-port of the first and second optical device and at the cross-port of the first optical device of the optical apparatus of FIG. 12, obtained for m=3, $\lambda x=\lambda z=1310$ nm and $\lambda y=1520$ nm.

FIG. 15 shows simulation results of the transfer function at the through port 151 of the first optical device 100 (denoted with A), at the cross port 153 of the first optical device 100 (denoted with B) and at the through port 151' of the second optical device 100' (denoted with C) of FIG. 12, obtained by exemplarily designing optical devices 100 and 100' as disclosed for FIG. 8.

From FIG. 15, it can been noted that at the through port 151' of the second optical device 100' an improvement of about 12.5 dB of the isolation of the first optical band (1310±50 nm) with respect to the second optical band (1520±40 nm) is obtained with the cascade configuration of FIG. 12.

It is noted that this improvement is achieved due to the fact that the transfer function B at the through port 151' of the second optical device 100' presents a narrowed passband with respect to that of the transfer function A at the through port 151 of the first optical device 100. However, as clear from FIG. 15, the invention, allowing the passband of the through port of the single optical device to be optimized in wideness and flatness, also allows said improvement in the isolation at the through port 151' to be obtained substantially without modifying the in-band losses within the second optical band at 1520±40 nm.

From FIGS. 5-11 and 15 it is clear that the optical device 100 (and the optical apparatus 600) according to the invention is suitable for being used in applications as, for example, FTTP networks wherein the splitting/combining of two wide bands widely spaced is required (e.g. of two bands centred at around $\lambda_1$=1310 nm±50 nm and $\lambda_2$=1520 nm±40 nm).

For example, optical device 100 can be used for splitting/combining two downstream signals having carrier wavelength selected within the range of 1490±10 nm and 1550±10 nm, respectively, from/with an upstream signal having carrier wavelength selected within the range of 1310±50 nm.

Figure 13:
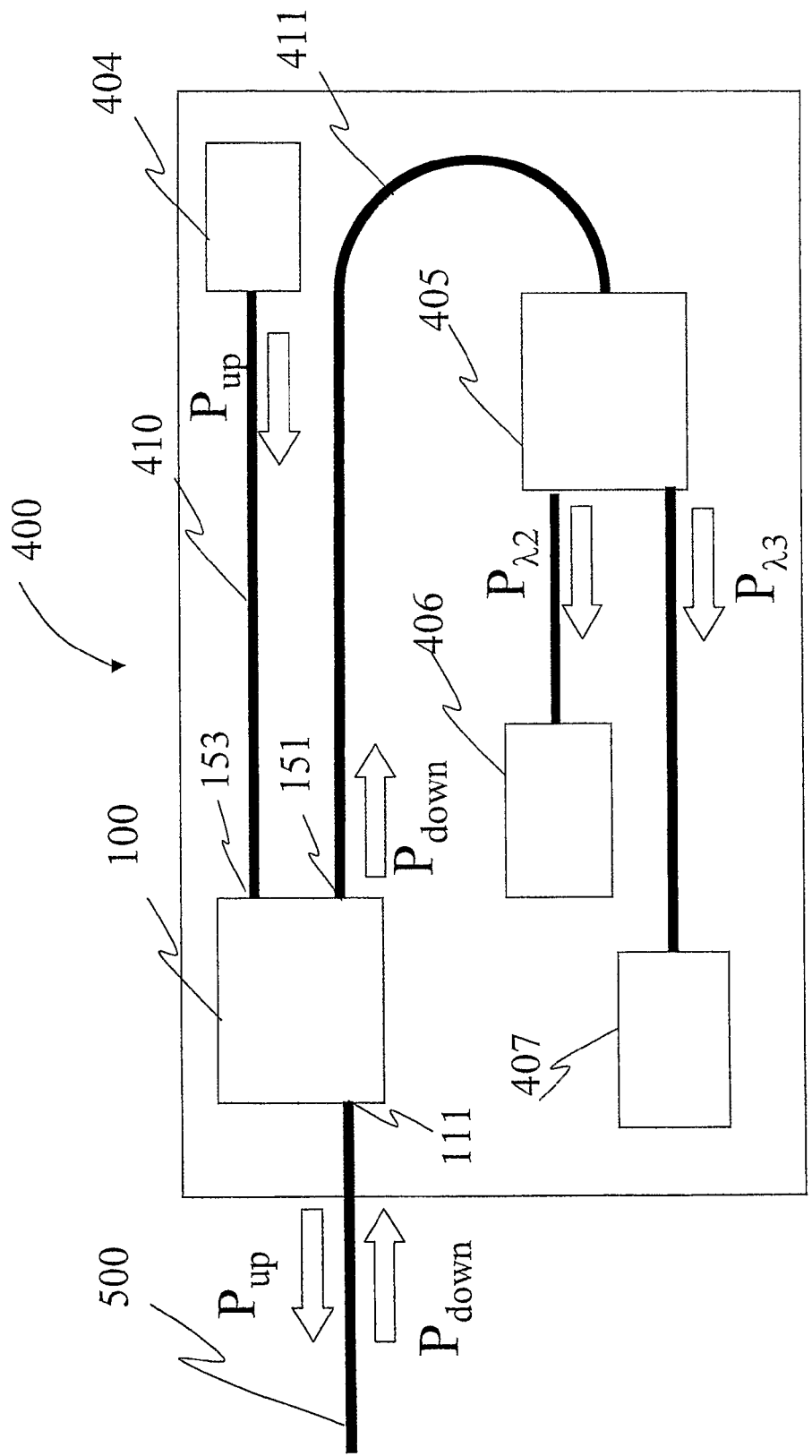
FIG. 13 shows a schematic diagram of an optical unit according to the invention.

FIG. 13 shows an exemplary optical unit 400 for use in FTTP networks, according to the present invention. The optical unit 400 may be an optical network unit (ONU), i.e. a terminal apparatus of the FTTP network, particularly of the triple play networks, on the customer side. Such a kind of apparatus is also known in the art as "triplexer".

The optical unit 400 comprises an optical device 100 in accordance to the present invention for splitting/combining a first and a second optical band (e.g. two bands centred at around 1310 nm±50 nm and 1520 nm±40 nm). The optical device 100 comprises two splitting/combining elements of the (25-50-25%)$\lambda$x/(0-0-100%)$\lambda$y type, wherein $\lambda$x is a wavelength within the first optical band (e.g., about 1310 nm) and $\lambda$y is a wavelength within the second optical band (e.g., about 1520 nm). The optical device 100 also comprises a port 111, a through port 151 and a cross port 153. Optical unit 400 further comprises an optical transmitter 404, apt to emit an optical radiation having a first wavelength $\lambda_1$ within the first optical band (e.g. about 1310 nm), and optically connected to the cross port 153, for example through optical waveguide 410. Optical unit 400 also comprises a first optical receiver 406 apt to receive a second optical wavelength $\lambda_2$ within the second optical band (e.g. about 1550 nm), and optically connected to the through port 151, for example through optical waveguide 411. The optical unit 400 typically comprises an additional optical band splitter 405 for splitting a third optical wavelength $\lambda_3$ within the second optical band (e.g. at about 1490 nm) from the second wavelength $\lambda_2$ and an additional optical receiver 407 apt to receive the third optical wavelength $\lambda_3$. Optical band splitter 405 may or may not be in accordance to the present invention. The first optical receiver 406 and the additional optical receiver 407 are optically connected to the through port 151, through the additional optical band splitter 405 and the optical waveguide 411.

In use, an optical signal $P_{up}$ at the first wavelength $\lambda_1$ emitted by optical transmitter 404 is directed, for example through waveguide 410, into the cross port 153 of the splitting/combining device 100. According to the operation of the device 100, most of the power at wavelength $\lambda_1$ (in a broad band of wavelengths $\lambda_1$) is then coupled into the optical port 111 of the device 100 and then fed into an optical transmission line 500 in an up-stream direction. An optical signal $P_{down}$ comprising a radiation at the second wavelength $\lambda_2$ and propagating through the optical transmission line 500 in a down-stream direction is fed to the optical port 111 of device 100. According to the operation of the device 100, most of the power at wavelength $\lambda_2$ (in a broad band of wavelengths $\lambda_2$) is coupled into the through optical port 151 and then directed, for example through waveguide 411, to the optical receiver 406.

When the optical signal $P_{down}$ fed to the optical port 111 of device 100 also comprises a radiation at the third wavelength $\lambda_3$, most of the power at both wavelength $\lambda_2$ and $\lambda_3$ is coupled into the through optical port 151 and then directed, for example through waveguide 411, into the additional optical band splitter 405 which splits the incoming radiation into two optical signals P$\lambda_2$ and P$\lambda_3$ having an optical power mostly at the wavelength $\lambda_2$ and $\lambda_3$, respectively. Each of the two optical signals is subsequently received by the respective optical receiver 406 and 407.

In a preferred configuration, optical unit 400 is based on planar waveguide technology in all or part of its components.

According to a preferred embodiment, the optical device 100 of FIG. 13 may be of the kind of the optical apparatus 600 shown in FIG. 12, comprising a cascade of two or more optical device 100 of the present invention.

The optical device 100, the optical apparatus 600 and the optical unit 400 in accordance with the present invention find particularly useful applications in optical networks apt to distribute telecommunication services to a plurality of customers. For example, optical networks may be triple play networks, passive optical networks, fiber-to-the-premises networks or, more generally, access networks. As already mentioned above, the services are carried through at least a downstream signal and an upstream signal having respectively a first and a second wavelength within respectively a first and a second optical band.

Figure 14:
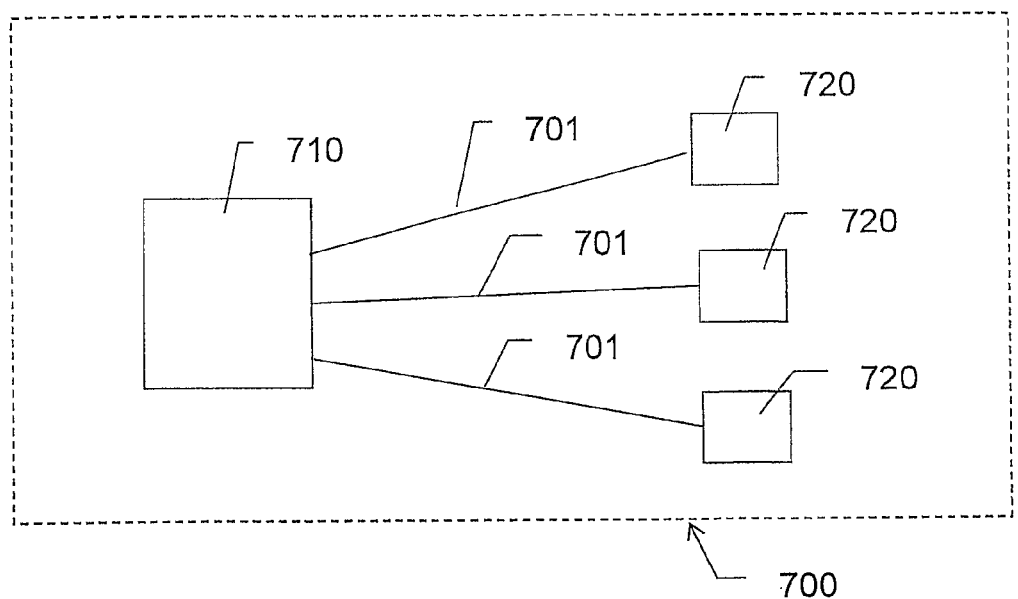
FIG. 14 shows a schematic diagram of an optical network according to the invention.

Exemplarily, as shown, in FIG. 14, the optical network 700 comprises a central station 710, a plurality of terminal stations 720, and a plurality of optical links 701 connecting each terminal station 720 to the central station 710. Each optical link 701 may comprise an optical fibre cable and may include passive or active optical devices apt to branch, add, route, amplify, attenuate or switch the optical signals propagating through the link. The terminal stations 720 comprise each an optical device according to the invention. For example, they comprise each an optical unit of the type described in FIG. 13, wherein $P_{up}$ comprises the upstream signal and $P_{down}$ comprises the downstream signal(s).

The invention claimed is:

1. An optical device for splitting/combining a first and second optical wavelength band, the optical device comprising:
   a first and a second optical splitting/combining element, each comprising a first, a second and a third optical path, the first optical path being optically coupled to the second optical path and the second optical path being optically coupled to the third optical path; and
   a differential optical delay device comprising a first, a second and a third optical path respectively interposed between and optically coupled to the first, second and third optical path of the first and second optical splitting/combining element, wherein:
   each of the first and second optical splitting/combining elements is of the (25-50-25%)λx/(0-0-100%)λy type, wherein λx is a wavelength within the first optical band and λy is a wavelength within the second optical band, and
   the first, second and third optical paths of the differential optical delay device are configured to introduce, at a wavelength λz within the first optical band, a phase delay Δϕ of 2πm to optical radiation propagating through the first optical path with respect to optical radiation propagating through the second optical path and to optical radiation propagating through the second optical path with respect to optical radiation propagating through the third optical path, wherein m is a integer other than zero.

2. The optical device according to claim 1, wherein the parameter m, in absolute value, is 2 to 5.

3. The optical device according to claim 2, wherein the parameter m, in absolute value, is equal to 3 or 4.

4. The optical device according to claim 1, wherein the optical device is a planar optical waveguide device.

5. The optical device according to claim 4, comprising three optical waveguides suitably arranged to form the first and the second optical splitting/combining elements and the differential optical delay device.

6. The optical device according to claim 4, comprising a waveguide core-to-cladding refractive index contrast greater than or equal to 1%.

7. The optical device according to claim 6, wherein the waveguide core-to-cladding refractive index contrast is greater than 2%.

8. The optical device according to claim 6, wherein the waveguide core-to-cladding refractive index contrast is lower than 4.5%.

9. The optical device according to claim 1, wherein the first and the second optical splitting/combining element and the differential optical delay device are configured so as to form a three-arm Mach-Zehnder interferometer structure.

10. The optical device according to claim 1, wherein the first, second and third optical paths of the differential optical delay device have optical lengths L1, L2, and L3, respectively, wherein L3 is equal to about L0, L2 is equal to about L0+ΔL and L1 is equal to about L0+2ΔL, wherein ΔL is equal to m*λz.

11. An optical apparatus for splitting/combining a first and a second optical wavelength band, comprising a first and a second optical device according to claim 1, optically connected in cascade.

12. The optical apparatus according to claim 11, wherein the first and the second optical devices each have an input port and a through port, the input port of the second optical device being connected to the through port of the first device.

13. An optical unit comprising:
   an optical device for splitting/combining a first and a second optical wavelength band according to claim 1;
   a receiver optically connected to the optical device and adapted to receive a first optical signal having a wavelength within one of the first and second optical bands; and
   an optical transmitter optically connected to the optical device and adapted to transmit a second optical signal having a wavelength within the other of said first and second optical bands.

14. The optical unit according to claim 13, further comprising a demultiplexer device optically connected to and interposed between the optical device and said optical receiver.

15. The optical unit according to claim 14, wherein the demultiplexer device is adapted to receive from the optical device and to separate in output said first optical signal and a third optical signal, the third optical signal having a wavelength within the same optical band of the first optical signal.

16. The optical unit according to claim 15, comprising a further optical receiver adapted to receive the third optical signal from the demultiplexer device.

17. An optical network comprising a central station, a plurality of terminal stations, each comprising an optical unit according to claim 13, and a plurality of optical links connecting the terminal stations to the central station.

* * * * *